United States Patent [19]

Harrison

[11] 3,840,726
[45] Oct. 8, 1974

[54] POSITION LOCATOR

[75] Inventor: Earnest R. Harrison, Glen Burnie, Md.

[73] Assignee: Westinghouse Electric Corporation, Pittsburgh, Pa.

[22] Filed: Jan. 15, 1973

[21] Appl. No.: 323,592

[52] U.S. Cl. ............... 235/150.27, 33/355, 33/366, 73/178 R, 235/189
[51] Int. Cl. .................... G06g 7/78, G01c 21/16
[58] Field of Search ....... 235/150.2, 150.25, 150.27; 73/178, 432; 33/324–326, 355–357, 361, 366

[56] References Cited
UNITED STATES PATENTS

| | | | |
|---|---|---|---|
| 3,355,942 | 12/1967 | Freeman | 73/178 |
| 3,545,266 | 12/1970 | Wilson | 235/150.25 |
| 3,654,443 | 3/1972 | Dendy et al. | 73/178 |

Primary Examiner—Felix D. Gruber
Attorney, Agent, or Firm—D. Schron

[57] ABSTRACT

A system for determining the course of travel of a carrier or wearer of an apparatus comprised of a pair of sensor arrays adapted to vectorially measure the earth's gravity and magnetic fields as well as the movement of the carrier which may be for example a human wearing the sensor apparatus on his leg. Analog signals representative of these vector quantities are fed to the system which includes vector operation circuitry for performing a double integration to determine the distance traveled in three coordinate directions corresponding to the orthogonal axes of the sensor apparatus while the sensor assembly is moving and thereafter performing a coordinate transformation to provide readouts corresponding to the North, East and vertical coordinates when the sensor apparatus is stationary.

9 Claims, 10 Drawing Figures

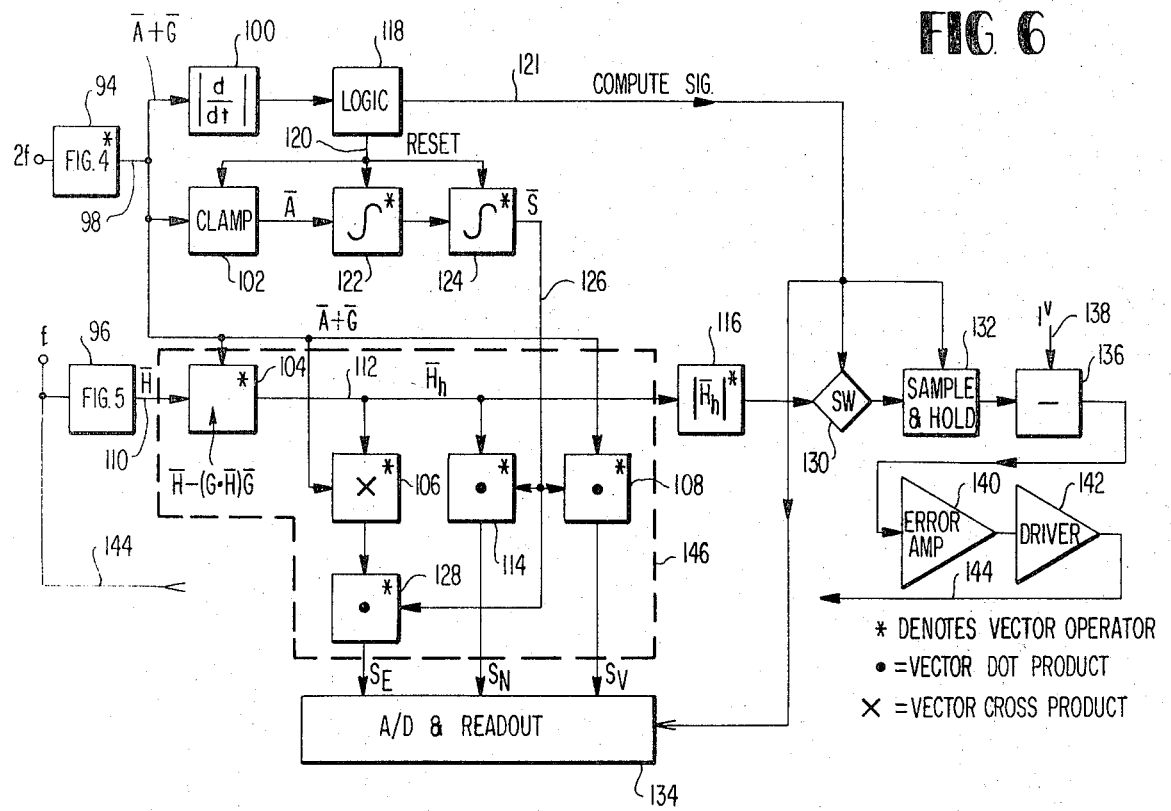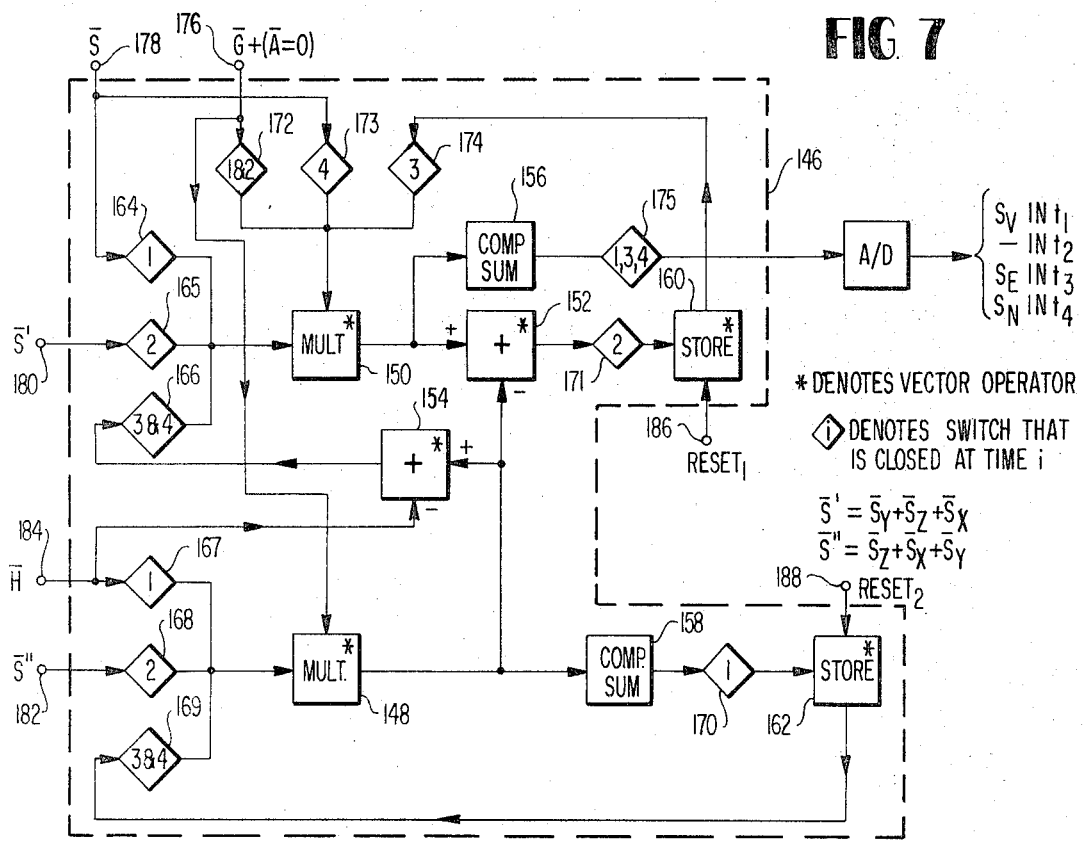

POSITION LOCATOR

CROSS REFERENCE TO RELATED APPLICATION

The present invention is related to co-pending application Ser. No. 294,134, entitled "An Electronic Compass System," filed in the name of Ernest R. Harrison, the present inventor, filed on Oct. 2, 1972. The assignee of the present invention is also the assignee of this related application.

BACKGROUND OF THE INVENTION

Field of the Invention

This invention relates to a dead reckoning position locator, and more particularly to a vector quantity computer adapted to determine distance and direction traveled by a carrier of an electrical sensor apparatus which measures heading angle in response to the earth's gravitational and magnetic fields. Still more particularly, the present invention is directed to means for computing a course of travel of a man having a sensor apparatus, comprised of strain gauge accelerometer and flux gate assemblies strapped to his leg. The invention is particularly useful in determining the wearer's course of travel, which may be, for example, a foot soldier or the like.

SUMMARY

Briefly, the subject invention is utilized in combination with sensor apparatus which provides electrical output signals corresponding to the earth's gravity vector $\bar{G}$, the acceleration vector $\bar{A}$ due to the motion of the compass, which might be, for example, the motion of the leg of the wearer of the sensor apparatus, and the earth's magnetic vector $\bar{H}$ along three mutually perpendicular axes X, Y and Z of the sensor apparatus. While the sensor apparatus is in a movement mode, the present invention includes means responsive to said electrical output signals representative of the composite $\bar{G}$ and $\bar{A}$ vector for performing a double integration with respect to time in order to determine the distance $\bar{S}$ traveled in each axis direction. During a stationary mode, the distance vector $\bar{S}$ in each of the aforesaid axis directions $\bar{S}_x + \bar{S}_y + \bar{S}_z$ is converted to North-East-vertical coordinates $\bar{S}_N + \bar{S}_E + \bar{S}_V$, utilizing the signals representative of the gravity vector $\bar{G}$ and the magnetic vector $\bar{H}$. Circuitry is additionally included for determining when the sensor apparatus is stationary for a predetermined length of time for resetting the double integrator means to zero. Also at the end of each computation cycle, the sensor output is clamped to zero to separate the acceleration vector $\bar{A}$ from the gravity vector $\bar{G}$ for the succeeding cycle.

BRIEF DESCRIPTION OF THE DRAWINGS

FIG. 6 is an electrical block diagram of the preferred embodiment of the subject invention; and FIG. 7 is an electrical block diagram illustrative of a multiplexed multiplier arrangement for providing the necessary computing operations in accordance with the subject invention.

DESCRIPTION OF THE PREFERRED EMBODIMENTS

Figure 1A:
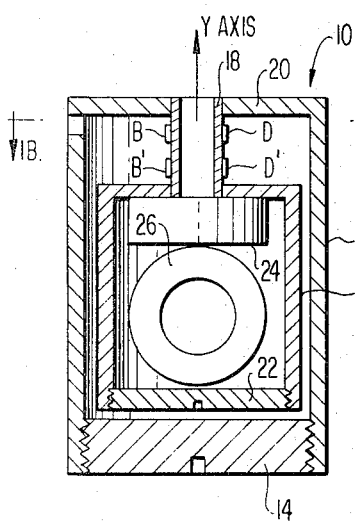
FIGS. 1A–1C are cross sectional views of strain gauge accelerometer and flux gate magnetometer sensor apparatus utilized in combination with the subject invention.
Figure 1B:
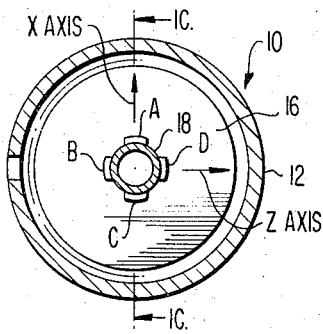
Figure 1C:
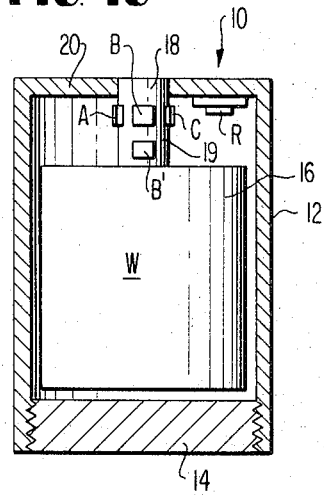

Referring now to the drawings and more particularly to FIGS. 1A, 1B and 1C, there is disclosed the physical embodiment of a composite strain gauge accelerometer and flux gate magnetometer sensor apparatus described and claimed in the above cross-referenced related application. Reference numeral 10 generally denotes the sensor apparatus comprised of, inter alia, a hollow, cylindrical body portion 12 having an opening in one end thereof with a screw threaded end portion 14 fitted thereto. The elements 12 and 14 are comprised of substantially non-magnetic material. Interiorally of the first body portion 12 is located a second hollow, cylindrical body portion 16 being held in a substantially rigid spaced relationship with the outer body portion 12 by means of a thin walled tube 18 secured to the end wall 20 of the outer body portion 12. A screw threaded end piece 22 is fitted to the inner body portion 12 as shown in FIG. 1A. The outer and inner body portions 12 and 16, respectively, are thus coaxial along the Y axis shown in FIG. 1A.

Figure 2:
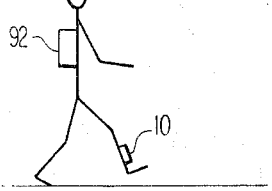
FIG. 2 is a diagram illustrative of the operational environment of the sensor apparatus illustrated in FIGS. 1A–1C.
Figure 3:
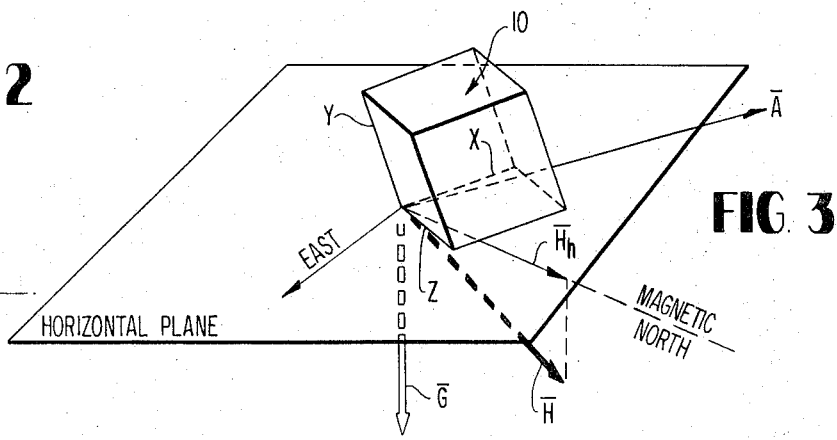
FIG. 3 is a vector diagram helpful in understanding the operation of the subject invention.

Three pairs of strain gauges A and C, B and D, B' and D', are mounted on the outer surface 19 of the thin walled tube 18 in mutually opposed relationship. A reference strain gauge R is mounted on the inner surface of the end wall 20 of the outer housing portion as shown in FIG. 1C. The strain gauges A, B, . . . R, define a three axis strain gauge accelerometer assembly for providing three orthogonal component output signals $\bar{G}_x + \bar{A}_x$, $\bar{G}_y + \bar{A}_y$, and $\bar{G}_z + \bar{A}_z$, corresponding to the earth's gravitational field vector $\bar{G}$ and the acceleration vector $\bar{A}$ of the carrier of the apparatus 10 which may be, for example, a man as shown in FIG. 2 with the apparatus 10 strapped to his leg. The three orthogonal output signals $\bar{G}_x + \bar{A}_x$, etc. correspond to the three mutually orthogonal X, Y and Z axes through the body portions 12 and 16 as shown in FIGS. 1A and 1B. It should be pointed out, however, that when the sensor apparatus 10 is stationary, e.g., the wearer's foot is on the ground the acceleration vector $\bar{A}$ is zero, leaving only the gravity vector $\bar{G}$. The Y axis corresponds to the central axis of the body portions 12 and 16 while the X and Z axes are mutually perpendicular axes at a plane normal to the central axis.

The strain gauges are used to measure the strain on the thin walled tube 18 in response to a tilting of the assembly 10 away from the horizontal. The tube 18 thus acts as a cantilever beam secured at one end to the upper wall 20 of the outer body portion 12 having a weight W (FIG. 1C) attached to the other end thereof, which weight consists of the inner body portions 16 and its contents comprising an assembly of two ring core flux gate magnetometers 24 and 26 mounted respectively in the plane of the X-Z axis and a plane perpendicular coextensive with the Y axis.

Figure 4:
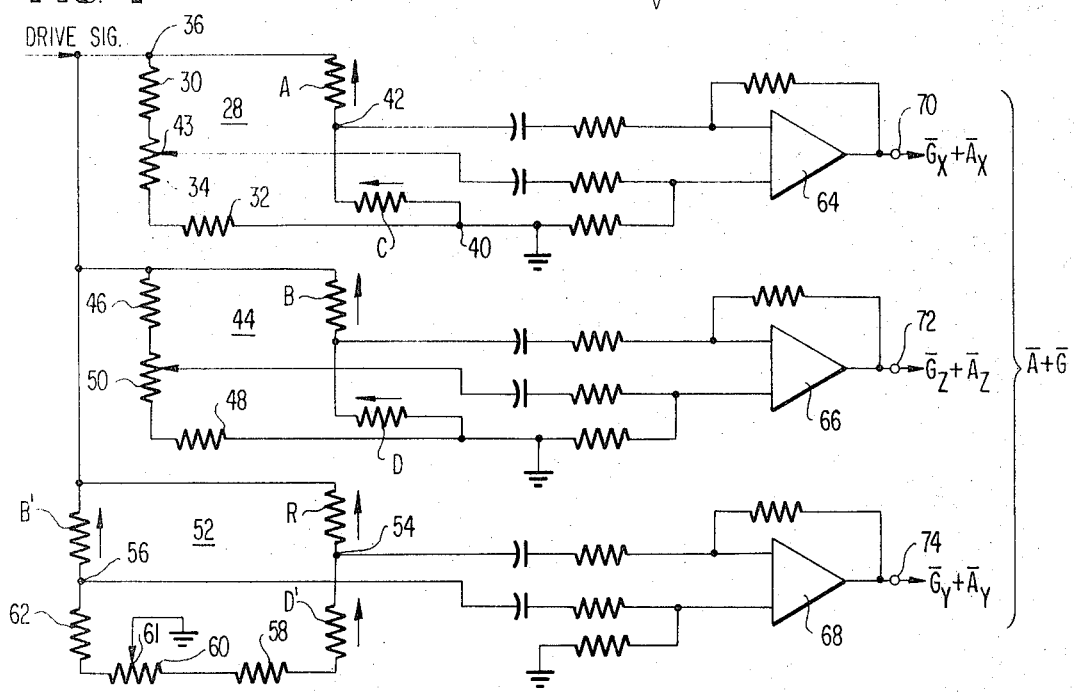
FIG. 4 is an electrical schematic diagram of the circuitry utilized in connection with the strain gauge sensor assembly.

The strain gauges A and C are adapted to measure the stress on the tube 18 in the X direction, while strain gauges B and D measure the stress in the Z direction. The strain gauges B' and D' are used for measuring the stress on the tube in the Y direction. Referring now to FIG. 4, the pairs of strain gauges are connected in respective Wheatstone bridge circuits. More particularly, strain gauges A and C are connected in adjacent legs of bridge circuit 28. The opposite legs of bridge circuit 28 is comprised of fixed resistors 30 and 32 of equal value having a small nulling potentiometer 34 connected therebetween. An AC drive signal is connected across the bridge input terminals 36 and 40, while the output is taken from the common connection 42 between strain gauges A and C and the wiper 43 of the potentiometer 34. In a like manner, strain gauges B and D are connected into the Wheatstone bridge circuit 44 in combination with fixed resistors 46 and 48 and the potentiometer 50.

In order for the strain gauges B' and D' to measure the stress of the tube 18 along the Y direction, they must be connected in opposite legs of a bridge circuit, such as shown with respect to the bridge configuration designated by reference numeral 52. The strain gauge pairs A and C, and E and D being in adjacent legs of the respective bridge circuits 28 and 44 are self-compensating insofar as temperature and long term drift effects are concerned. With respect to the bridge circuit 52, on the other hand, strain gauges B' and D' are not self-compensating and therefore the reference strain gauge R is utilized for this purpose. Accordingly, strain gauges D, and R are connected in adjacent legs of the bridge circuit 52 while the strain gauge B' is connected in a leg opposite from the reference strain gauge R. The output terminals of the bridge 52 comprise terminals 54 and 56. The bridge leg including strain gauge D' also includes a fixed resistor 58 coupled to a potentiometer 60 whose slider 61 is returned to ground. The fourth leg of the bridge is comprised of fixed resistor 62 and the other portion of the potentiometer 60. The outputs of the bridge circuits 28, 44 and 52 are coupled to the respective AC operational amplifiers 64, 66 and 68 having output terminals 70, 72 and 74. The circuitry shown in FIG. 4 provides composite output signals corresponding to the rectangular components of the earth's gravity field $\bar{G}$ and the acceleration vector $\bar{A}$ and thus comprise analog signals of force vectors along the X, Y, Z axes of the sensor apparatus 10. For a more detailed treatment of the strain gauge configuration, reference is made to the related application Ser. No. 294,134.

Figure 5:
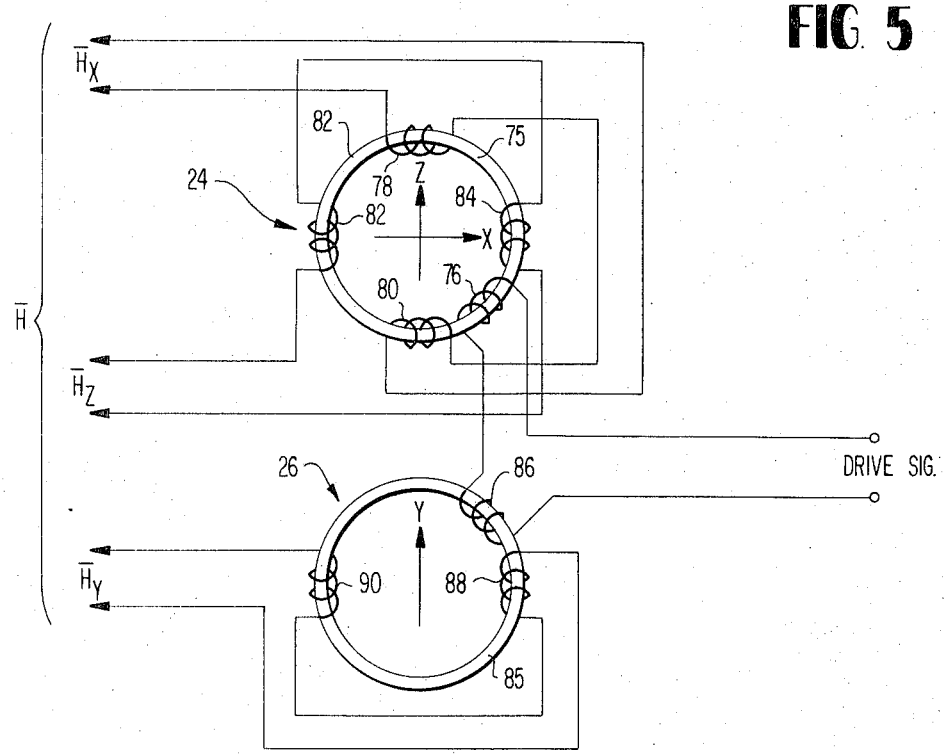
FIG. 5 is an electrical schematic diagram of the flux gate magnetometer sensor assembly.

Referring now to FIG. 5, the schematic disclosed therein is illustrative of the flux gate magnetometer assembly circuitry utilized for measuring the earth's magnetic field vector $\bar{H}$ relative to the X, Y and Z axes of the apparatus 10. The circuitry comprises ring core magnetometers 24 and 26 shown physically oriented inside the inner housing body portion 16 as shown in FIG. 1A. The flux gate magnetometer 24 is comprised of a torroidal or ring core 75 upon which is wound drive winding 76 and a first pair of windings 78 and 80 connected in series opposition to provide a signal output corresponding to $\bar{H}_x$. A second pair of series opposition windings 82 and 84 provide an output signal corresponding to $\bar{H}_z$. The flux gate magnetometer 26, on the other hand, is comprised of a core 85 upon which is wound a drive winding 86 and a pair of output windings 88 and 90 connected in series opposition to provide an output signal corresponding to $\bar{H}_y$.

The ring core flux gate magnetometer assembly as disclosed in FIG. 1A and FIG. 5 can be made with high sensitivity. For example a device having a core diameter in the order of 0.5 inches can provide outputs greater than 0.5 volts for a full earth field H of 0.60 oersteds with an output impedance of approximately 1,000 ohms. The electrical drive signals for circuitry shown in FIG. 4 as well as the bridge circuitry shown in FIG. 4 exclusive of the strain gauges A, B, etc. can be contained in a separate package 92 which can be carried be the wearer of the apparatus 10 such as shown in FIG. 2.

Assuming that the sensor apparatus 10 is strapped to a man's leg, enough information is available from the electrical analog output signals $\bar{G}$, $\bar{A}$ and $\bar{H}$ and more particularly from the X, Y and Z axis components thereof to determine his course of travel. For example, when the foot holding the assembly 10 is on the ground, the gravity vector $\bar{G}$ may be determined because the acceleration vector $\bar{A}$ is equal to zero. Once $\bar{G}$ is known, the acceleration vector $\bar{A}$ due to the motion of the foot as well as the magnetic vector $\bar{H}$ may be determined whether the foot is on the ground or not. Since the analog outputs of the circuitry shown in FIGS. 4 and 5 are analog output signals representative of component vectors along the rectangular coordinate axes of the assembly 10 in order to determine the wearer's course of travel, it is necessary to transform the X, Y, Z coordinates into North (N), East (E), and vertical (V) compass coordinates.

In vector notation, the earth's gravity vector $\bar{G}$ can be expressed as:

$$\bar{G} = |\bar{G}_x|\ \bar{a}_x + |\bar{G}_y|\ \bar{a}_y + |\bar{G}_z|\ \bar{a}_z \text{ or simply,} \quad (1a)$$
$$\bar{G} = \bar{G}_x + \bar{G}_y + \bar{G}_z \quad (1b)$$

where $|\bar{G}|$ is the scaler magnitude of the vector along a particular axis, and $\bar{a}$ is a unit vector in the direction of the same particular axis. Thus $\bar{G}_x = |G_x|\ \bar{a}_x$, etc. In the same manner, the earth's magnetic field vector $\bar{H}$ and the acceleration vector $\bar{A}$ can be simply expressed as:

$$\bar{H} = \bar{H}_x + \bar{H}_y + \bar{H}_z \text{ and}$$

(2)

$$\bar{A} = \bar{A}_x + \bar{A}_y + \bar{A}_z$$

(3)

If one were to resolve the acceleration vector $\bar{A}$ into the vertical, North, and East direction components $\bar{A}_V$, $\bar{A}_N$ and $\bar{A}_E$, respectively, the following operations must be performed:

$$\bar{A}_V = \bar{G} \cdot \bar{A}$$

(4)

$$\bar{A}_N = \bar{H}_h \cdot \bar{A}$$

(5)

$$\bar{A}_E = \bar{G} \times \bar{H}_h\ \bar{A} \text{ where}$$

(6)

$$\bar{H}_h = \bar{H} - (\bar{G} \cdot \bar{H})\ \bar{G}$$

(7)

A double integration with respect to time of the acceleration vector $\bar{A} = \bar{A}_x + \bar{A}_y + \bar{A}_z$ on the other hand results in the distance traveled along the X, Y and Z axes, i.e. $\bar{S} = \bar{S}_x + \bar{S}_y + \bar{S}_z$. Considering $S \cong A$, and the double integration of the acceleration vector $\bar{A}$ in view of equations (4) through (6), reference is now made to FIG. 6 which discloses in block diagrammatic form the preferred embodiment of the subject invention which is adapted to mechanize the following equations:

$$\bar{S}_V = \bar{G} \cdot \bar{S} \tag{8}$$

$$\bar{S}_N = \bar{H}_h \cdot \bar{S} \tag{9}$$

$$\bar{S}_E = \bar{G} \times \bar{H}_h \cdot \bar{S} \tag{10}$$

For equations (7) through (10) to be true, the absolute value of $\bar{H}_h$ and $\bar{G}$ must be normalized to unity. The absolute value of $\bar{G}$ should be constant and may be set to unity by the gain adjustments of the operational amplifiers 64, 66 and 68 shown in FIG. 4. The quantity $\bar{H}_h$ may be normalized by feedback to the drive voltage applied to the flux gates shown in FIG. 5.

Considering now FIG. 6, reference numeral 94 and 96 respectively represent the strain gauge sensor circuitry shown in FIG. 4 and the flux gate accelerometer circuitry shown in FIG. 5, bearing in mind that the analog signals representative of the vectors $\bar{G}$, $\bar{A}$ and $\bar{H}$ are each comprised of three separate analog component signals representative of the orthogonal components along the X, Y, Z axes of the apparatus 10. Data line 98 comprised of three conductors which carries the composite of signals $\bar{A} + \bar{G}$ is coupled from the circuitry shown in FIG. 4 and more particularly terminals 70, 72 and 74 to: a differentiator circuit 100 which is adapted to operate on the composite analog signal consisting $\bar{A}$ and $\bar{G}$, a clamp circuit 102, an analog vector operation circuit 104 for performing the computation required of equation (7), an analog vector cross ($x$) product operation circuit 106 and a dot ($\cdot$) product operation circuit 108. The analog output signals from the flux gate circuitry 96 corresponding to the vector $\bar{H}$ are coupled by means of data line 110 comprised of three conductors into analog circuit 104 whose output comprises the analog signals corresponding to $\bar{H}_h$ and appears on three conductor data line 112. Data line 112 is coupled into the cross product operator 106 and into a second dot product operation circuit 114. Additionally, the data line 112 feeds into an analog circuit 116 for providing a scaler or absolute value of the vector quantity $\bar{H}_h$.

A logic circuit 118 is coupled to the output of the differentiator circuit 100 for determining when $|d\bar{A}/dt| \cong 0$. The fact that the input vector is composed of accelerations due to velocity $\bar{A}$ and due to gravity $\bar{G}$ is of no consequence since the magnitude of the derivative of this composite is still zero when the sensor 10 is stationary, e.g., when the wearer's foot is on the ground, $\bar{G}$ is a constant and thus does not differentiate. At such time circuit 100 provides a reset signal to begin a compute cycle over circuit line 120 to the clamp circuit 102 and to analog integrator circuits 122 and 124 which are adapted to perform a double integration with respect to time on the next appearing vector quantity $\bar{A}$ when subsequent movement of the sensor occurs, i.e., when the wearer takes a step. The second integrator circuit 124 provides analog output signals corresponding to the quantity $\bar{S} = \bar{S}_x + \bar{S}_y + \bar{S}_z$ which is coupled by means of three conductor data line 126 to the vector dot product circuits 108 and 114 as well as a third dot product operation circuit 128. The logic circuit 118 additionally couples a second control signal (compute) to a data output switch 130, a sample and hold circuit 132 which is coupled to the switch 130, and to an analog to digital converter circuit and readout means 134. A comparator circuit 136 is coupled to the sample and hold circuit and receives a reference voltage (1 volt) over circuit lead 138 for purposes which will be explained subsequently. The comparator circuit 136 provides an error signal output which is fed into an error amplifier 140, which amplifier is coupled into a driver circuit 142 providing a feedback signal via circuit lead 144 to the flux gate magnetometer circuitry 96.

In operation, the logic circuit 118 is adapted to be responsive to the output of the differentiator circuit 100 such that when the absolute value, $|d\bar{A}/dt| = 0$, occurs which means that the man's foot is on the ground the signals appearing on data line 98 corresponds only to the vector information $\bar{G}$. The logic circuit 118 resets the integrators 122 and 124 and causes the clamp circuit 102 to be activated, whereupon the following step provides an output thereof of $\bar{A}$ the clamp removes $\bar{G}$ from the composite signal $\bar{A} + \bar{G}$ from which a double integration takes place, providing an output $\bar{S}$ on data line 126. The gravity vector $\bar{G}$ is thus computed first at the beginning of the compute cycle when the sensor is static and $\bar{A}$ is zero, followed by a double integration of the acceleration vector $\bar{A}$ when the sensor is in motion, the horizontal projection of the earth's magnetic vector $\bar{H}_h$ is first computed in the circuit 104 and applied to the vector multipliers 106 and 114 followed by the application of the distance vector $\bar{S}$ to the multipliers 108, 114 and 128 from which the distances in the East, North and vertical directions are applied to the analog to digital converter circuitry 134. As noted above, when the sensor 10 is stationary, $\bar{A}$ is zero so that the signal on data line 98 consists solely of the $\bar{G}$ vector. Since the $\bar{G}$ vector is vertical and is made to have a unity magnitude, as noted earlier in the specification, it may be used to find $\bar{H}_h$. The vertical component of $\bar{H}$ is the dot product $\bar{G}$ and $\bar{H}$, i.e., $H_v = \bar{G} \cdot \bar{H}$. Now, by multiplying $H_v$ by the unity vector $\bar{G}$, a vertical vector $\bar{H}_v$ with the magnitude of the vertical magnetic field is obtained. If this vector $\bar{H}_v$ is subtracted from $\bar{H}$, then the vector $\bar{H}_h$ is obtained. Stated mathematically, $\bar{H}_h = \bar{H} - (\bar{G} \cdot \bar{H}) \bar{G}$.

The circuitry 116, the sample and hold circuit 132 as well as the comparator circuit 136 is utilized to provide a normalization of the vector quantity $\bar{H}_h$. Thus while the foot carrying the sensor apparatus 10 is in the air, the vectors $\bar{A}_x$, $\bar{A}_y$ and $\bar{A}_z$ are continuously measured and integrated twice to determine the distance traveled in each direction $\bar{S}_x$, $\bar{S}_y$ and $\bar{S}_z$. When the foot is stationary on the ground, the $\bar{S}$ vector in the X, Y, Z coordinates is converted to the North, East and vertical coordinates. The circuits 104, 106, 108, 114 and 128 shown in FIG. 6 comprise analog multipliers taking the form of any desired configuration presently known to those skilled in the art, for example, integrated circuit four quadrant multipliers. That such apparatus is well known is set forth in U.S. Pat. No. 3,654,443, Dendy et al., at column 3, lines 35–38. Moreover, typical examples of such apparatus for carrying out analog vectorial calculations can be found in the 1972 Product Guide of Analog Devices, Inc. at pages 115-121 inclusive and more particularly the monolithic computation circuits included in Model AD531 as indicated on page 116. When desirable, these calculations can be made digitally without departing from the spirit and scope of the invention.

Where it is desired to reduce the number of analog multipliers required, the multiplex configuration of FIG. 7 can be utilized for time sharing the multipliers shown by reference numeral 146 shown in FIG. 6. The configuration in FIG. 7 utilizes a pair of multiplier circuits 148 and 150, a pair of adder circuits 152 and 154, a pair of circuits 156 and 158 for summing vector components, a pair of storage devices 160 and 162, and a plurality of switches 164, 165, 166, 167, ... 175 which are adapted to be respectively closed during one or more of four time intervals shown in FIG. 8. Each of the switches with exception of 175 actually comprises a switch block including three parallely actuated switches. Switch 175 is comprised of a single switch. When the wearer's foot is on the ground and $\bar{A}=0$, the gravity vector $\bar{G}$ signals which appear on data line 98 shown in FIG. 6, are applied to terminal 176 which is connected to switch 172 and multiplier 148. When the wearer's foot is in the air, the double integration output signals corresponding to $\bar{S}$ appearing on data line 126 is applied to terminal 178. Input terminal 178 is connected to switch 164 and 173. Whereas the analog vector quantity of $\bar{S}$ is expressed as:

$$\bar{S} = \bar{S}_x + \bar{S}_y + \bar{S}_z \quad (11)$$

Signals $\bar{S}'$ and $\bar{S}''$ having the analog terms rearranged as follows:

$$\bar{S}' = \bar{S}_y + \bar{S}_z + \bar{S}_x \quad (12)$$

$$\bar{S}'' = \bar{S}_z + \bar{S}_x + \bar{S}_y \quad (13)$$

are respectively applied to terminal 180 which is connected to switch number 165 and to terminal 182 which is coupled to switch 168. The magnetic vector $\bar{H}$ which would for example appear on data line 110 of FIG. 6 is applied to terminal 184 which terminal is connected to switch 167 and the (−) input of the adder circuit 154. Control signals corresponding to the signals appearing on circuit leads 120 and 121 of FIG. 6, are applied to terminals 186 and 188 which terminals are coupled to the storage devices 160 and 162, respectively. These signals correspond to waveforms 188 and 190 shown in FIG. 8, whereas control signals corresponding to the four time periods are illustrated by waveforms 192, 194, 196 and 198, are also generated by a suitable logic circuit such as shown by reference numeral 118 in FIG. 6.

Figure 8:
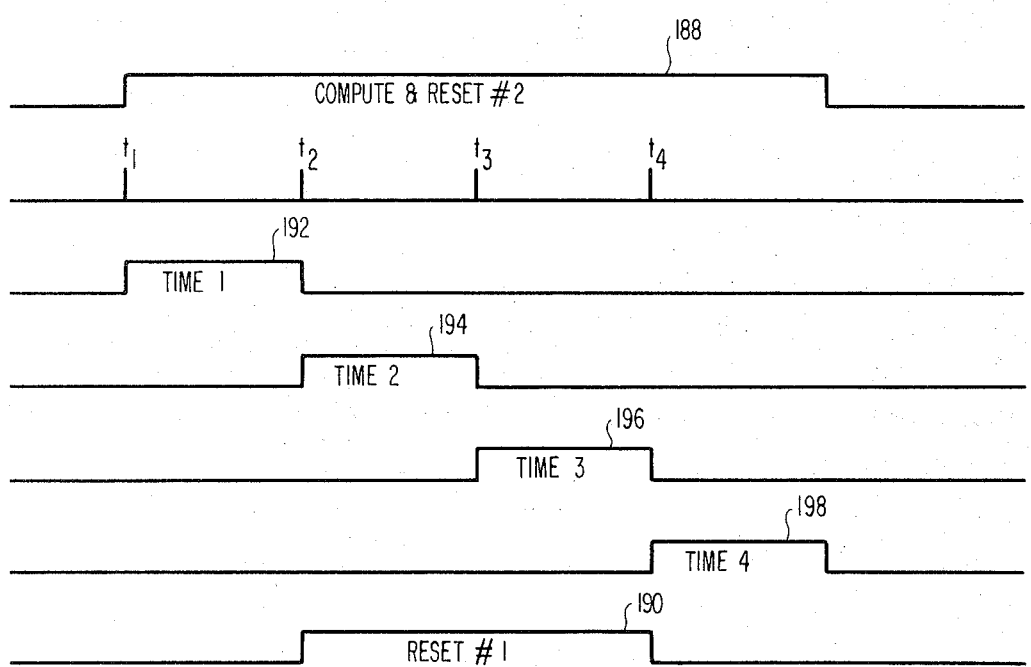

In operation, the circuitry shown in FIG. 7 operates in the four time periods $t_1$, $t_2$, $t_3$ and $t_4$ as shown in FIG. 8 over each computation cycle and provide analog outputs of $\bar{S}_r$ in the time period $t_1$, the output $\bar{S}_E$ in time period $t_3$ and $\bar{S}_N$ in the time period $t_4$. In the second time period $t_2$, no output is provided because the switch 175 is opened. Also, a meaningless output would be provided at that time, should switch 175 remain closed. It can be seen for example that during time period $t_1$, switch 164 and 172 provide inputs to the multiplier 150 which is adapted to provide an output of $\bar{G} \cdot \bar{S}$ which according to equation (4) provides the required output. Also during time period $t_1$, switches 167 and 170 are closed, which feeds the analog vector component signals $\bar{H}$ and $\bar{G}$ to the multiplier 151 whose output is stored in the storer 162. The data stored during time period $t_1$ in the store 162 and the data stored in time period $t_2$ by means of switch 172 being closed in combination with switches 165 and 168 provide the necessary data to perform the required computations in times $t_3$ and $t_4$ to provide the necessary computation to solve equation (6) and equation (5).

The position locator system described herein has several advantages over the prior art in that there are no moving parts, resulting in greater reliability and mechanical simplicity. Also, the system is independent of operator parameters, meaning that the compass assembly itself may be mounted in any orientation and the system will accurately measure the course if the operator walks sideways or backwards as well as forwards.

Having described what is at present considered to be the preferred embodiment of the subject invention, I claim:

1. A position locator system mounted on a carrier and having both momentary static and moving modes of operation during each cycle of operation, comprising in combination:

first sensor apparatus and circuit means therefor providing a composite electrical output signal comprised of a gravitational force vector component signal $\bar{G}$ and an acceleration force vector component signal $\bar{A}$, said vector component signal $\bar{A}$ being substantially equal to zero during the stationary mode of operation of said first sensor apparatus;

second sensor apparatus and circuit means therefor providing an electrical output signal corresponding to a magnetic pole force vector $\bar{H}$;

first circuit means coupled to said first sensor apparatus, being responsive to said composite output signal and providing an output signal corresponding to the derivative of the scalor magnitude of said composite output signal;

a logic circuit coupled to the output of said first circuit means and being responsive to the output signal thereof to generate a control signal when the derivative of said composite output signal is substantially zero;

a clamping circuit having an input coupled to said first sensor apparatus and being activated by said control signal from said logic circuit to clamp said composite signal during a moving mode of said sensor to remove the vector component signal $\bar{G}$ from said composite output signal to thereby provide substantially only said vector component signal $\bar{A}$;

double integration circuit means coupled to said clamping circuit and being responsive to the vector component signal $\bar{A}$, performing a double integration with respect to time on said vector component signal $\bar{A}$ to provide electrical output signal $\bar{S}$ corresponding to distance;

first vector operation circuit means coupled to said second sensor means and being responsive to the magnetic vector signal $\bar{H}$ provided thereby and to said first sensor apparatus, being responsive to said vector component signal $\bar{G}$ when said vector component signal $\bar{A}$ is substantially zero and including means for normalizing the scalor value of the signal $\bar{G}$ to unity and maintaining said unity value substantially constant and means performing the vector operation $\bar{H} - (\bar{G} \cdot \bar{H}) \bar{G} = \bar{H}_h$ and providing an electrical output signal $\bar{H}_h$ which is a component of the vector signal $\bar{H}$ along a substantially horizontal plane;

second vector operation circuit means coupled to said first vector operation circuit means and said electrical output signal $\bar{H}_h$ provided thereby and said second circuit means and said output signal $\bar{S}$ provided thereby and including circuit means performing the vector operation $\bar{H}_h \cdot \bar{S} = S_N$ and providing an electrical output signal $S_N$ which is a north compass coordinate component signal of $\bar{S}$;

third vector operation circuit means coupled to said first sensor apparatus, being responsive to the vector component signal $\bar{G}$ when said vector component signal $\bar{A}$ is substantially zero and said first vector operation circuit means and said electrical output signal $\bar{H}_h$ provided thereby and said second circuit means and said output signal $\bar{S}$ provided thereby, including circuit means performing the vector operation $\bar{G} \times \bar{H}_h \cdot \bar{S} = S_E$ and providing an electrical output signal $S_E$ which is an east compass coordinate component signal of $\bar{S}$; and means coupled to said electrical output signals $S_N$ and $S_E$ providing a visual representation thereof.

2. The locator system as defined by claim 1 and additionally including fourth vector operation circuit means coupled to said first sensor apparatus, being responsive to said vector component signal $\bar{G}$ when said vector component signal $\bar{A}$ is substantially zero and to said double integration circuit means and said distance signal $\bar{S}$ provided thereby, said fourth vector operation circuit means including circuit means performing the vector operation $\bar{G} \cdot \bar{S} = S_V$ and providing an electrical output signal $S_V$ which is a vertical coordinate component signal of $\bar{S}$.

3. The system as defined by claim 2 and additionally including means coupled to said electrical output signal $S_V$ providing a visual representation thereof.

4. The system as defined by claim 3 wherein said means coupled to said electrical output signals $S_V$, $S_N$ and $S_E$ additionally includes analog to digital conversion means.

5. The system as defined by claim 4 and additionally including digital readout means coupled to said analog to digital conversion means.

6. The locator system as defined by claim 1 wherein said first sensor apparatus comprises:
substantially non-magnetic support means attached to said carrier adapted for movement in selected compass directions;
a cantilevered beam member having one end rigidly attached to said support means;
a weight under the influence of the environment's gravitational field and the moving mode of operation attached to the other end of said beam member;
an electrically powered accelerometer assembly mounted on said beam member and being responsive to the stress upon said beam member caused by said weight to generate an analog composite electrical output signal; and
wherein said second sensor apparatus comprises: an electrically powered flux gate magnetometer assembly housed in said support means and generating an analog electrical output signal corresponding to the magnetic pole force vector $\bar{H}$.

7. The system as defined by claim 6 and additionally including means for attaching said support means to a human limb adapted to move while walking, running and the like.

8. The system as defined by claim 7 wherein said first, second, and third vector operation circuit means comprises analog computing elements.

9. The system as defined by claim 7 wherein said human limb comprises the leg.

* * * * *